United States Patent
Amamoto et al.

(10) Patent No.: US 7,208,129 B2
(45) Date of Patent: Apr. 24, 2007

(54) REPROCESSING METHOD BY FLUORIDE VOLATILITY PROCESS USING SOLID-GAS SEPARATION

(75) Inventors: Ippei Amamoto, Higashi-Ibaraki-gun (JP); Koji Sato, Higashi-Ibaraki-gun (JP)

(73) Assignee: Japan Nuclear Cycle Development Institute, Ibaraki-Ken (JP)

( * ) Notice: Subject to any disclaimer, the term of this patent is extended or adjusted under 35 U.S.C. 154(b) by 52 days.

(21) Appl. No.: 11/097,258

(22) Filed: Apr. 4, 2005

(65) Prior Publication Data
US 2006/0057043 A1 Mar. 16, 2006

(30) Foreign Application Priority Data
Jul. 30, 2004 (JP) ............................. 2004-224655

(51) Int. Cl.
 G21C 19/44 (2006.01)
 C01G 43/06 (2006.01)
 C01G 56/00 (2006.01)
(52) U.S. Cl. ...................... 423/251; 423/249; 423/258; 423/259; 423/3; 423/19
(58) Field of Classification Search .............. 423/3, 423/19, 489, 249, 251, 253, 258, 259
See application file for complete search history.

(56) References Cited

U.S. PATENT DOCUMENTS

| | | | | |
|---|---|---|---|---|
| 3,644,104 A | * | 2/1972 | Manevy et al. ............... | 423/3 |
| 3,708,568 A | * | 1/1973 | Golliher et al. .............. | 423/6 |
| 4,710,222 A | * | 12/1987 | FitzPatrick et al. .......... | 75/393 |
| 5,118,343 A | * | 6/1992 | Coops ........................ | 75/396 |
| 5,264,196 A | * | 11/1993 | Tanaka et al. ............... | 423/258 |
| 5,431,891 A | * | 7/1995 | Gabriac et al. .............. | 423/19 |
| 6,442,226 B1 | * | 8/2002 | Venneri et al. .............. | 376/170 |
| 2005/0287059 A1 | * | 12/2005 | Indech ........................ | 423/253 |

FOREIGN PATENT DOCUMENTS

JP 2001-153991 6/2001

* cited by examiner

*Primary Examiner*—Ngoc-Yen Nguyen
(74) *Attorney, Agent, or Firm*—Wenderoth, Lind & Ponack, L.L.P.

(57) ABSTRACT

Fluorine or a fluorine compound is subjected to a reaction with a spent oxide fuel to produce fluorides of uranium and plutonium, and the fluorides are recovered using a difference in volatility behavior. The spent oxide fuel is subjected to a reaction with an HF gas, whereby uranium, plutonium and most impurities are converted into solid fluorides having low valences or remained as oxides to inhibit volatilization thereof, and then in an $F_2$ fluorination step, the HF fluorination product is subjected to a reaction with a fluorine gas in two stages: one at a low temperature and the other at a high temperature, whereby a certain amount of gaseous uranium and volatile impurities are separated with plutonium kept in a solid form in the first stage, and mixed fluorides of remaining uranium and plutonium are fluorinated into hexafluorides at the same time in the second stage. By such a reprocessing method, plutonium enrichment can be adjusted, uranium and plutonium can be purified, and steps are simplified as well. In addition, reactors are hard to be corroded or deteriorated.

2 Claims, 3 Drawing Sheets

REPROCESSING METHOD BY FLUORIDE VOLATILITY PROCESS USING SOLID-GAS SEPARATION

BACKGROUND OF THE INVENTION

1. Field of the Invention

The present invention relates to a method of separating and purifying nuclear fuel substances using a difference in fluorination volatility behavior of uranium, plutonium and other elements in a spent oxide fuel to reprocess the spent oxide fuel.

2. Description of the Related Art

A fluoride volatility process is one of methods for dry reprocessing of a spent fuel, in which nuclear fuel substances such as uranium and plutonium and various kinds of nuclear fission products are separated and recovered using a difference in volatility behavior when they are fluorinated. Techniques for applying the fluoride volatility process to a reprocessing process have been developed in the U.S. and other various countries since 1950s. However, each of those techniques has problem in higher fluorination and purification of plutonium. None of these techniques has reached a practical phase, and there has been no progress since 1970s.

In Japan, Japan Atomic Energy Research Institute has carried out the fluoride volatility process, and many advantages have been found, but development of the technique has been ended without establishing a plutonium purification step. In the fluoride volatility process carried out in that institute, uranium and plutonium are separated by two-stage fluorination using a fluidized bed furnace as a reactor with the temperature and fluorine concentration being changed. For example, in the first stage, uranium is fluorinated with an $F_2$ concentration of 20% at the operating temperature of 330° C., and in the second stage, plutonium is fluorinated with an $F_2$ concentration of 100% at the operating temperature of 330 to 550° C.

However, there is a disadvantage that it takes much time to convert uranium into uranium hexafluoride ($UF_6$) because the reaction temperature in "fluorination of uranium" of the first stage is low. Further, in "fluorination of plutonium" of the second stage, there is a disadvantage that plutonium is hard to be converted into plutonium hexafluoride ($PuF_6$) (the conversion ratio or conversion rate decreases) from the point of view of thermodynamics and reaction temperature because plutonium forms into $PuF_4$ of an intermediate fluoride in the first stage, and the fluorine concentration is so high that incomplete fluidization easily occurs.

Thus, a reprocessing process according to a fluoride volatility process using a flame furnace as a reactor has been proposed (see, for example, Japanese Patent Laid-Open Specification No. 2001-153991). Unlike the fluidized bed furnace, the flame furnace is a reactor operating under conditions of high temperature and high fluorine gas atmosphere.

If plutonium is converted under the conditions, a direct fluorination reaction of $PuO_2 + 3F_2$ (or 6F) → $PuF_6 + O_2$ occurs, and therefore $PuF_4$ is never produced as an intermediate fluoride. In addition, because the fluorination temperature and fluorine concentration are high, decomposition reaction of $PuF_6$ is hard to proceed. However, since a corrosive gas at high temperatures and in high concentrations is required for the reaction, and conversion conditions are severe, the reactor is easily corroded and deteriorated, thus causing a problem in terms of materials. In addition, there are disadvantages that temperature adjustment for conversion conditions of a target substance is impossible, a large amount of expensive fluorine gas is used, and so on.

SUMMARY OF THE INVENTION

Problems to be solved by the present invention are to establish a method making it possible to adjust the plutonium enrichment and purify uranium and plutonium by volatilizing and separating a predetermined amount of uranium, to simplify steps such as separation as much as possible, to establish a method for producing $PuF_6$ in which the material of a reactor is harder to be corroded, to reduce a consumption of expensive fluorine gas, and so on.

According to the present invention, there is provided a reprocessing method by a fluoride volatility process using solid-gas separation in which fluorine or a fluorine compound is subjected to a reaction with a spent oxide fuel to produce fluorides of uranium and plutonium, and recover uranium and plutonium as the fluorides using a difference in volatility behavior, the reprocessing method comprising the steps of:

HF fluorination of the spent oxide fuel in the reaction thereof with a hydrogen fluoride gas, thereby converting uranium and plutonium compounds and most impurities in the spent fuel into nonvolatile solid fluorides or oxides having low valences to inhibit volatilization thereof; and $F_2$ fluorination of the HF fluorination product in the reaction thereof with a fluorine gas which reaction is controlled in two stages: one at a lower temperature and the other at a higher temperature, thereby separating an arbitrary amount of gaseous uranium hexafluoride and volatile impurities with plutonium kept in a solid form in the first stage, and fluorinating the mixed fluorides of the remaining uranium and plutonium into hexafluorides at the same time in the second stage.

As described above, the present invention is characterized in that the spent oxide fuel is subjected to a reaction with a hydrogen fluoride gas having a weak oxidizing power, whereby only $UF_4$ (solid) is produced for uranium compounds, and only $PuF_4$ (solid) is produced for plutonium compounds to inhibit volatilization, and plutonium is separated from uranium and volatile impurities by solid-gas separation taking advantage of the characteristic of $PuF_4$ that it is hard to undergo a reaction into a fluoride having a high valence (higher fluoride).

In the reprocessing method, a raw material for uranium enrichment can be produced by trapping purified $UF_6$ alone with at least one cold trap, and a raw material for MOX (mixed oxide) fuel can be produced by trapping an enrichment adjusted-mixture of $UF_6$ and $PuF_6$ with at least one cold trap.

In the reprocessing method by the fluoride volatility process using the solid-gas separation according to the present invention, the spent oxide fuel is subjected to a reaction with hydrogen fluoride to consciously produce $PuF_4$ hard to undergo a reaction into a higher fluoride as an intermediate fluoride in the HF fluorination step so that the plutonium fluoride remains as a solid in a furnace, and then $UF_4$ is converted into $UF_6$ (gas) with $PuF_4$ unchanged in the first stage of $F_2$ fluorination, and therefore plutonium can be separated from uranium and the like in the $F_2$ fluorination step, the step is simplified, and the plutonium enrichment can be adjusted. In addition, since fluidized bed furnaces are used to carry out reactions under lenient conditions in both the HF fluorination step and $F_2$ fluorination step, the bed furnaces are hard to be corroded or deteriorated.

DETAILED DESCRIPTION OF THE PREFERRED EMBODIMENTS

Figure 1:
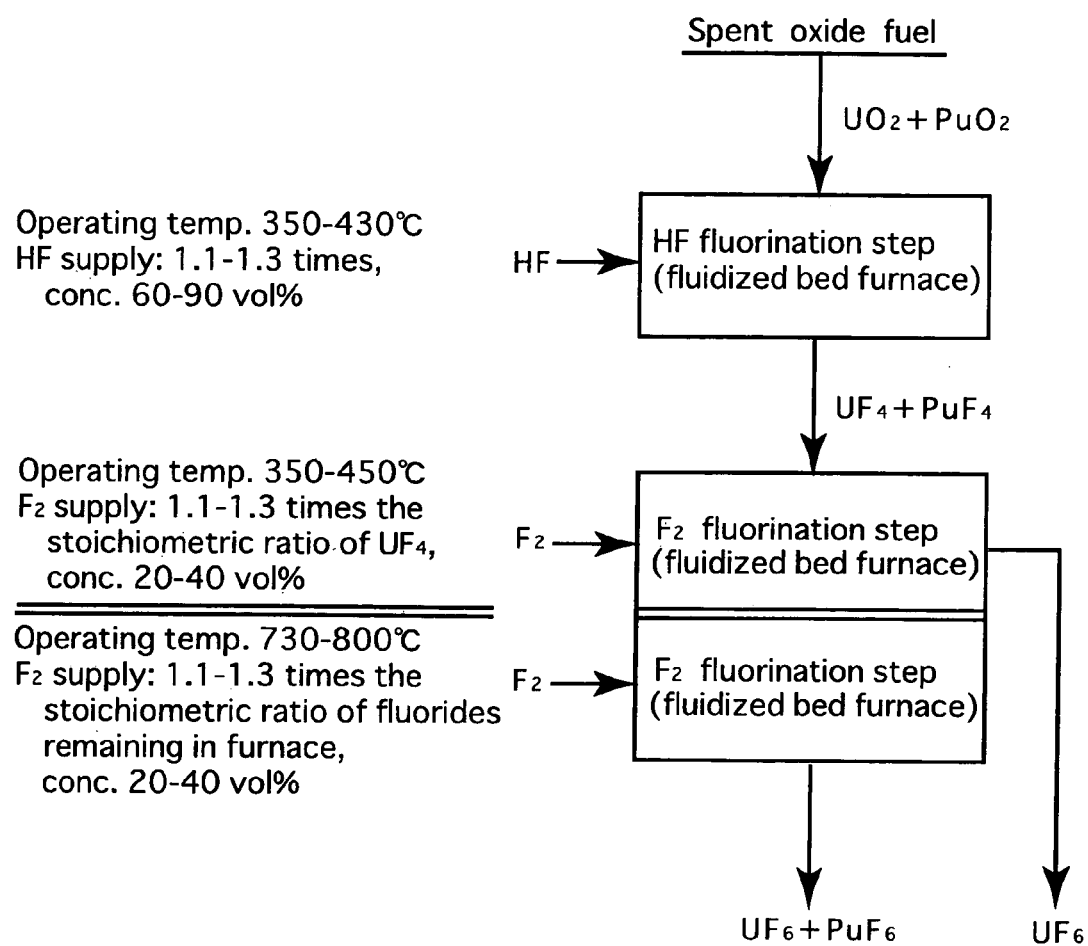
FIG. 1 is an explanatory diagram showing a basic process of a reprocessing method by a fluoride volatility process using solid-gas separation according to the present invention.

FIG. 1 is an explanatory view showing a basic process of a reprocessing method by a fluoride volatility process using solid-gas separation according to the present invention. This is a reprocessing method in which fluorine or a fluorine compound is subjected to a reaction with a spent oxide fuel to produce fluorides of uranium and plutonium, and recover uranium and plutonium as $UF_6$ and $UF_6+PuF_6$ using a difference in volatility behavior. The method of the present invention comprises an HF fluorination step and an $F_2$ fluorination step in two stages of different temperatures.

In the HF fluorination step, a spent oxide fuel containing $UO_2$ and $PuO_2$ is subjected to a reaction with a hydrogen fluoride gas, whereby uranium, plutonium and most impurities in the spent fuel are converted into solid fluorides or oxides to inhibit volatilization. The HF fluorination step is carried out by supplying a hydrogen fluoride gas (supplied amount: 1.1 to 1.3 times the stoichiometric ratio, concentration: 60 to 90 vol %) using a fluidized bed furnace operated in the temperature range of 350 to 430° C. Since the hydrogen fluoride gas has a weak oxidizing power, a non-volatile fluoride having a low valence (lower fluoride) is produced by the HF fluorination reaction. Only $UF_4$ (solid) is produced for uranium compounds, and only $PuF_4$ (solid) is produced for plutonium compounds. Impurities can be made to remain in the furnace as solid fluorides or oxides except for tellurium difluoride ($TeF_2$). For the hydrogen fluoride gas supply, an optimum amount was found to be 1.15 times the stoichiometric ratio from thermodynamic calculation and empirically, and a hydrogen fluoride gas supply which is 1.1 to 1.3 times the stoichiometric ratio brought about a preferred result. The used amount of expensive fluorine gas can be reduced by about 67% compared to conventional methods because an HF gas is used in the HF fluorination.

In the first stage of the $F_2$ fluorination step, the HF fluorination product is subjected to a reaction with a fluorine gas at a relatively low temperature, whereby uranium is converted into $UF_6$ (gas) with plutonium kept in the form of $PuF_4$ (solid), and plutonium is separated from a part of uranium using solid-gas separation. The first stage $F_2$ fluorination step is carried out by supplying a fluorine gas (supplied amount: 1.1 to 1.3 times the stoichiometric ratio of $UF_4$) diluted to 20 to 40 vol % using a fluidized bed furnace operated in the temperature range of 350 to 450° C. At this time, the plutonium enrichment in the furnace can be adjusted by volatilizing a predetermined amount of uranium. Moreover, a large amount of impurities is volatilized, and therefore a mixture of uranium and plutonium remaining in the furnace can be purified.

In the second stage of the $F_2$ fluorination step, the remaining product of the first stage of the $F_2$ fluorination is subjected to a reaction with the fluorine gas at a relatively high temperature, whereby mixed fluorides of remaining uranium and plutonium are fluorinated into hexafluorides at the same time. The second stage $F_2$ fluorination step is carried out by supplying a fluorine gas (supplied amount: 1.1 to 1.3 times the stoichiometric ratio of all fluorides remaining in the furnace) diluted to 20 to 40 vol % using the fluidized bed furnace operated in the temperature range of 730 to 800° C. At this time, by increasing the fluorine gas supply, the stability and production rate of $PuF_6$ can be improved.

In this way, the fluoride volatility process can be applied to recover uranium and plutonium as $UF_6$ and $UF_6+PuF_6$. By selectively condensing purified $UF_6$ alone, or the $UF_6 \cdot PuF_6$ mixture after adjustment of the enrichment, $UF_6$ and $UF_6 + PuF_6$ can be used for producing a raw material for uranium enrichment (light water reactor nuclear fuel cycle) and a raw material for MOX (mixed oxide) (FBR nuclear fuel cycle). If the processing object is a spent metal fuel, the method of the present invention can be applied by oxidizing the metal fuel as preprocessing.

EXAMPLES

Figure 2:
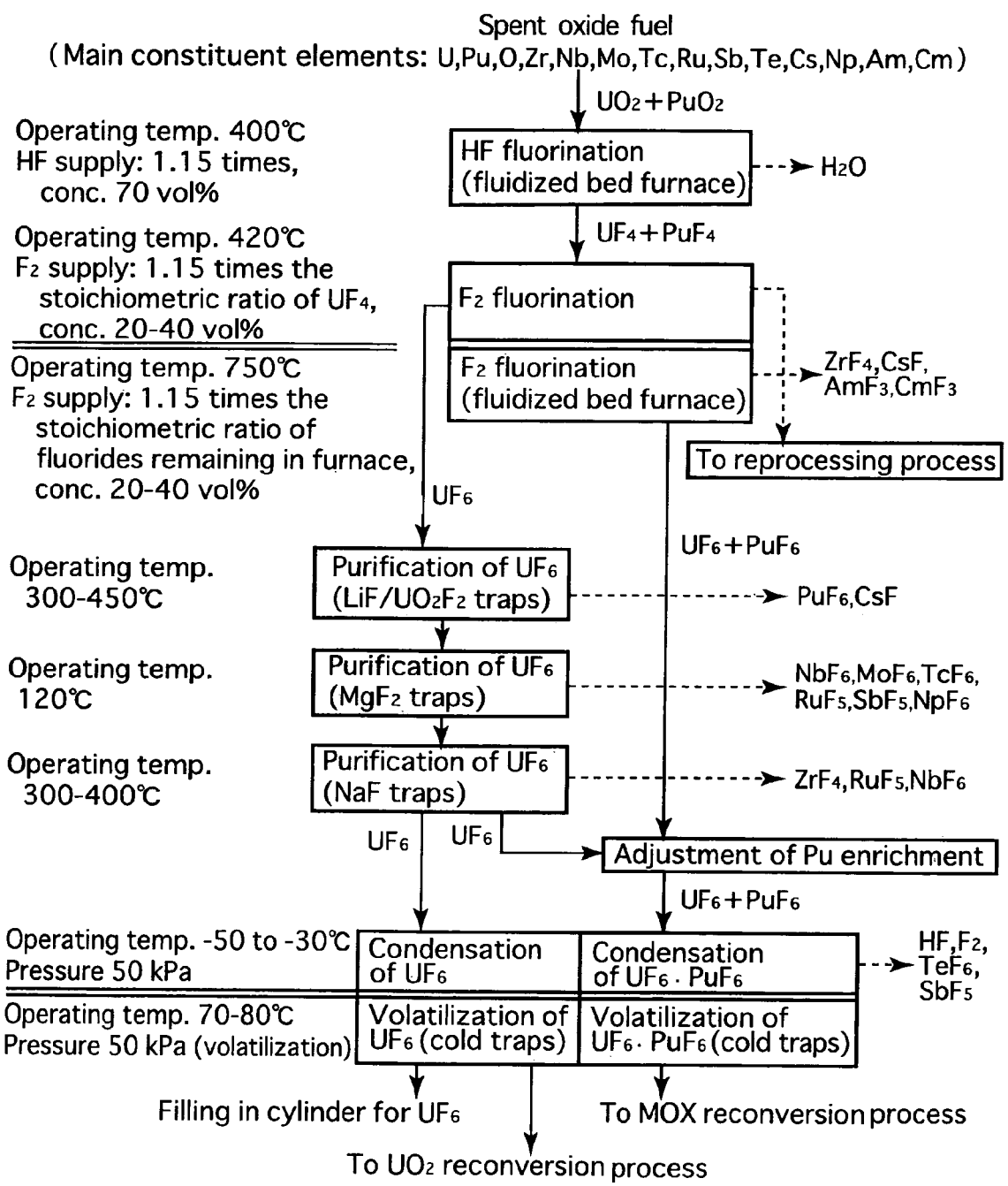
FIG. 2 is a process flow showing one example of the reprocessing method by the fluoride volatility process using solid-gas separation according to the present invention.

FIG. 2 is a process flow showing one example of the reprocessing method by the fluoride volatility process using solid-gas separation according to the present invention. This is an example of a process of reprocessing a spent oxide fuel. The spent oxide fuel as a raw material has been subjected to decladding processing, and its main constituent elements include U, Pu, O, Zr, Nb, Mo, Tc, Ru, Sb, Te, Cs, Np, Am and Cm, and uranium exists in a form of $UO_2$ and plutonium exits in a form of $PuO_2$. These raw materials are fluorinated in two stages.

<HF Fluorination>

In HF fluorination, a raw material (spent oxide fuel) is subjected to a reaction with an HF gas (supply: 1.15 times the stoichiometric ratio, concentration: 70 vol %) using a fluidized bed furnace (operating temperature: 400° C.). Consequently, $UF_4$ and $PuF_4$ are produced. Most impurities in the raw material form into fluorides or oxides. Resulting reactions are as shown below.

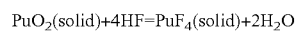

$PuO_2(solid)+4HF=PuF_4(solid)+2H_2O$

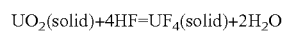

$UO_2(solid)+4HF=UF_4(solid)+2H_2O$

<First Stage $F_2$ Fluorination>

In the first stage $F_2$ fluorination, a partial intermediate fluoride produced by HF fluorination is converted into a hexafluoride. The operating temperature of the fluidized bed furnace is set to 420° C., and the HF fluorination product is subjected to a reaction with a fluorine gas to produce a hexafluoride of uranium. The fluorine gas to be supplied is diluted with an $N_2$ gas to set the concentration to 20 to 40 vol %, and the supplied amount is set to 1.15 times the stoichiometric ratio required for conversion of $UF_4$ into $UF_6$. By this reaction, uranium is converted into $UF_6$ (gas). Many impurities form into volatile fluorides along with $UF_6$. However, most plutonium does not change from the form of $PuF_4$, and therefore by appropriately controlling the reaction for pro ducing $UF_6$, the plutonium enrichment can be adjusted in the fluidized bed furnace.

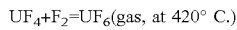

$$UF_4 + F_2 = UF_6 \text{(gas, at 420° C.)}$$

<Second Stage $F_2$ Fluorination>

In the second stage $F_2$ fluorination, the operating temperature of the fluidized bed furnace is increased to 750° C., and the remaining product of the first stage of the $F_2$ fluorination is subjected to a reaction with a fluorine gas to produce hexafluorides of uranium and plutonium. The fluorine gas to be supplied is diluted with an $N_2$ gas to set the concentration to 20 to 40 vol %, and the supplied amount is set to 1.15 times the stoichiometric ratio required for highly fluorinating all fluorides and oxyfluorides (except for a bed material) remaining in the furnace. By this reaction, uranium is converted into $UF_6$ (gas) and plutonium is converted into $PuF_6$ (gas). By this operation, nonvolatile substances such as $ZrF_4$, CsF, $AmF_3$ and $CmF_3$ remain along with the bed material. By increasing the fluorine gas supply, the stability of $PuF_6$ can be improved and the conversion ratio can be increased. For example, if fluorine is supplied in an amount 6.8 times the stoichiometric ratio, the conversion ratio is about 40%.

<Refinement of $UF_6$>

$UF_6$ produced by the first stage $F_2$ fluorination contains a very small amount of $PuF_6$ and volatile impurities. These impurities are made to pass through chemical traps filled with a substance having an action of chemically adsorbing the impurities, whereby the impurities can be removed to purify $UF_6$. Chemical traps are installed in multiple stages as required.

(1) LiF—$UO_2$ $F_2$ Traps

In this process, chemical traps using lithium fluoride (LiF) and uranyl fluoride ($UO_2F_2$) either alone or in combination as a filler are used in the first stage for the purpose of removal of $PuF_6$. Instead thereof, any filler having an action of reducing $PuF_6$ may be used, and use of $UF_4$ and $UF_5$ can be considered as well. The reaction between LiF and $PuF_6$ is a reversible reaction, $PuF_6$ is adsorbed to LiF at the operating temperature of 300° C., and desorbed from LiF by heating it to 450° C. Thus, LiF is used at the operating temperature of 300° C. CsF is adsorbed at the temperature, too. $PuF_6$ adsorbed to $UO_2F_2$ can be used in an MOX (mixed oxide) reconverting process as a raw material without being desorbed.

(2) $MgF_2$ Traps

Chemical traps using $MgF_2$ as a filler are provided in the second stage. $MgF_2$ has an action of adsorbing $NbF_6$, $MoF_6$, $TcF_6$, $RuF_5$, $SbF_5$ and $NpF_6$, and is used at the operating temperature of 120° C. here.

(3) NaF Traps

Chemical traps using NaF as a filler are installed in the third stage. NaF is known to adsorb $UF_6$ through the reaction of $UF_6 + 2NaF \rightarrow Na_2UF_8$ at 25 to 250° C. $Na_2UF_8$ decomposes into NaF and $UF_6$ again at 300 to 400° C., but NaF forms double salts with $RuF_5$ and $NbF_6$ at the temperature. It has an action of adsorbing $ZrF_4$, but most of $ZrF_4$ remains in the fluidized bed furnace as a nonvolatile substance along with the bed material, and only a very small amount thereof is removed by the NaF traps.

<Adjustment of Pu Enrichment>

A mixed gas of volatilized $UF_6$ and $PuF_6$ and $UF_6$ purified by the chemical traps are mixed together in a desired ratio using a gas mixer, and the plutonium enrichment is adjusted. For operating conditions of the gas mixer, a slightly negative pressure and a temperature of about 70 to 80° C. are adopted.

<Condensation of $UF_6$/$UF_6 \cdot PuF_6$>

$UF_6$ not used for adjustment of the plutonium enrichment, of $UF_6$ purified by the chemical traps, or a mixed gas of $UF_6$ after adjustment of the plutonium enrichment and $PuF_6$ is condensed. The operating temperature is −50 to −30° C., and the pressure is about 50 kPa.

<Volatilization of $UF_6$/$UF_6 \cdot PuF_6$>

The temperature is increased to 70 to 80° C. with the pressure (50 kPa) unchanged, whereby the condensed $UF_6$ or mixture of $UF_6$ and $PuF_6$ is vaporized and provided for a reconversion process.

If vaporized simple $UF_6$ is filled in a cylinder for $UF_6$, it can be used as a raw material for uranium enrichment, and this process can be used in a light water reactor fuel cycle. As an option, by setting conditions for liquefying $UF_6$, in which the temperature of the cold traps trapping $UF_6$ is 64° C. or higher and the pressure is 152 kPa or greater, $UF_6$ can be liquefied and filled in the cylinder.

Figure 3:
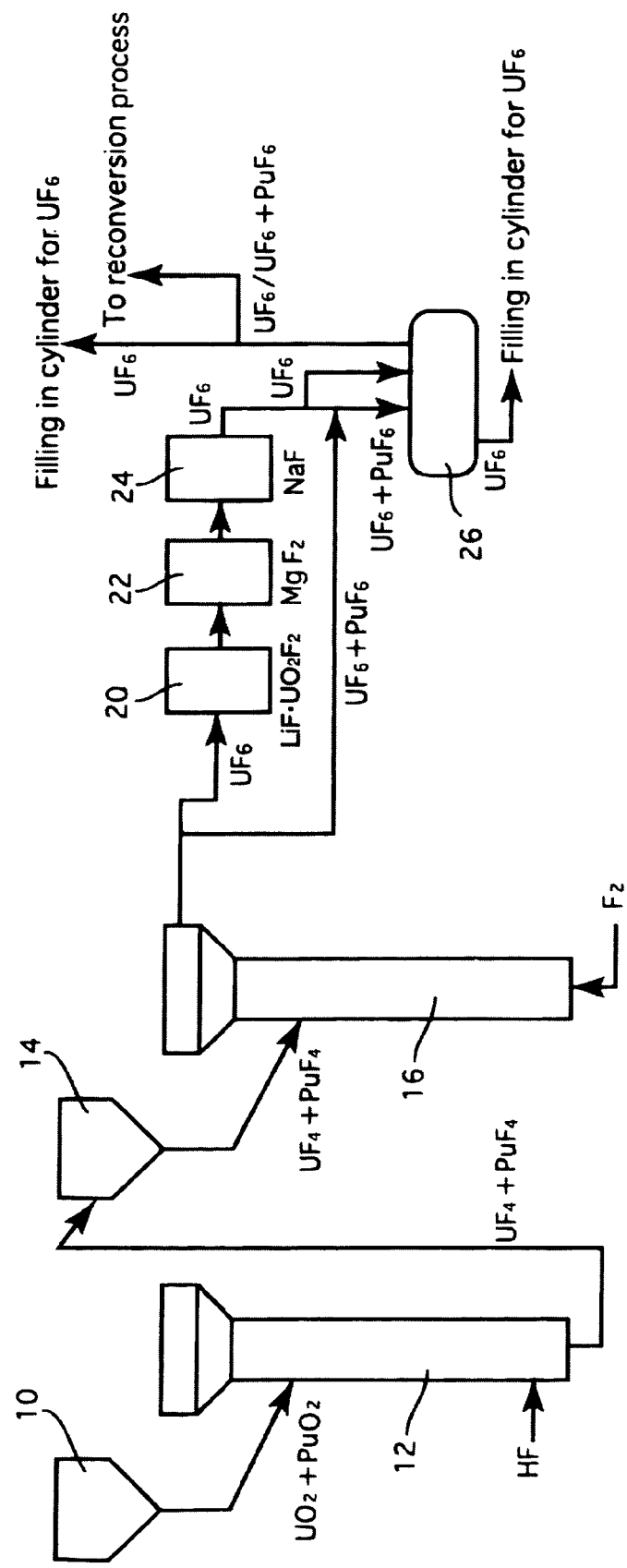
FIG. 3 is a block diagram of an apparatus for carrying out the reprocessing method by the fluoride volatility process using solid-gas separation according to the present invention.

FIG. 3 is a block diagram of an apparatus for carrying out the above reprocessing method by a fluoride volatility process using fractional distillation. A raw material (spent oxide fuel) in a raw material supply tank 10 is fed to an HF fluorination furnace (fluidized bed furnace) 12, reacts with an HF gas into an intermediate material, and is stored in an intermediate fluoride supply tank 14. The intermediate fluoride in the intermediate fluoride supply tank 14 is fed to an $F_2$ fluorination furnace (fluidized bed furnace) 16, and reacts with an $F_2$ gas into a hexafluoride.

$UF_6$ obtained by the first stage $F_2$ fluorination is purified through LiF/$UO_2$ $F_2$ traps 20, $MgF_2$ traps 22 and NaF traps 24, and introduced into cold traps 26. $UF_6$ and $UF_6 \cdot PuF_6$ obtained by the second stage $F_2$ fluorination are also introduced into the cold traps 26. In the cold traps 26, $UF_6$ is condensed and volatilized and $UF_6 \cdot PuF_6$ is condensed and volatilized, and they are provided for the reconversion process.

What is claimed is:

1. A reprocessing method by a fluoride volatility process using solid-gas separation in which fluorine or a fluorine compound is subjected to a reaction with a spent oxide fuel to produce fluorides of uranium and plutonium, and recover uranium and plutonium as the fluorides using a difference in volatility behavior, the reprocessing method comprising the steps of:

HF fluorination of the spent oxide fuel in the reaction thereof with a hydrogen fluoride gas using a fluidized bed furnace operated in a temperature range of 350 to 430° C., thereby converting uranium and plutonium compounds and most impurities in the spent oxide fuel into nonvolatile solid fluorides or oxides having low valences to inhibit volatilization thereof; and $F_2$ fluorination of the HF fluorination product in the reaction thereof with a fluorine gas which reaction is controlled in two stages: the first stage at a lower temperature using a fluidized bed furnace operated in a temperature range of 350 to 430° C. and the second stage at a higher temperature using a fluidized bed furnace operated in a temperature range of 730 to 800° C., thereby separating an arbitrary amount of gaseous uranium hexafluoride and volatile impurities with plutonium kept in a solid form in the first stage, and fluorinating the mixed fluorides of the remaining uranium and plutonium into hexafluorides at the same time in the second stage.

2. The reprocessing method by a fluoride volatility process using solid-gas separation according to claim 1, wherein a raw material for uranium enrichment is produced by purifying the $UF_6$ from the first stage and trapping purified $UF_6$ alone with at least one cold trap, and a raw material for MOX (mixed oxide) fuel is produced by adjusting the ratio of $UF_6$ and $PuF_6$ in the mixed fluorides obtained from the second stage to form an enrichment adjusted-mixture and trapping said enrichment adjusted-mixture of $UF_6$ and $PuF_6$ with at least one cold trap.

* * * * *